Feb. 14, 1956  E. P. WENZELBERGER  2,734,355
SUCTION APPARATUS FOR THE SEPARATION OF FLUID AND SOLIDS
Filed March 13, 1952  2 Sheets-Sheet 1
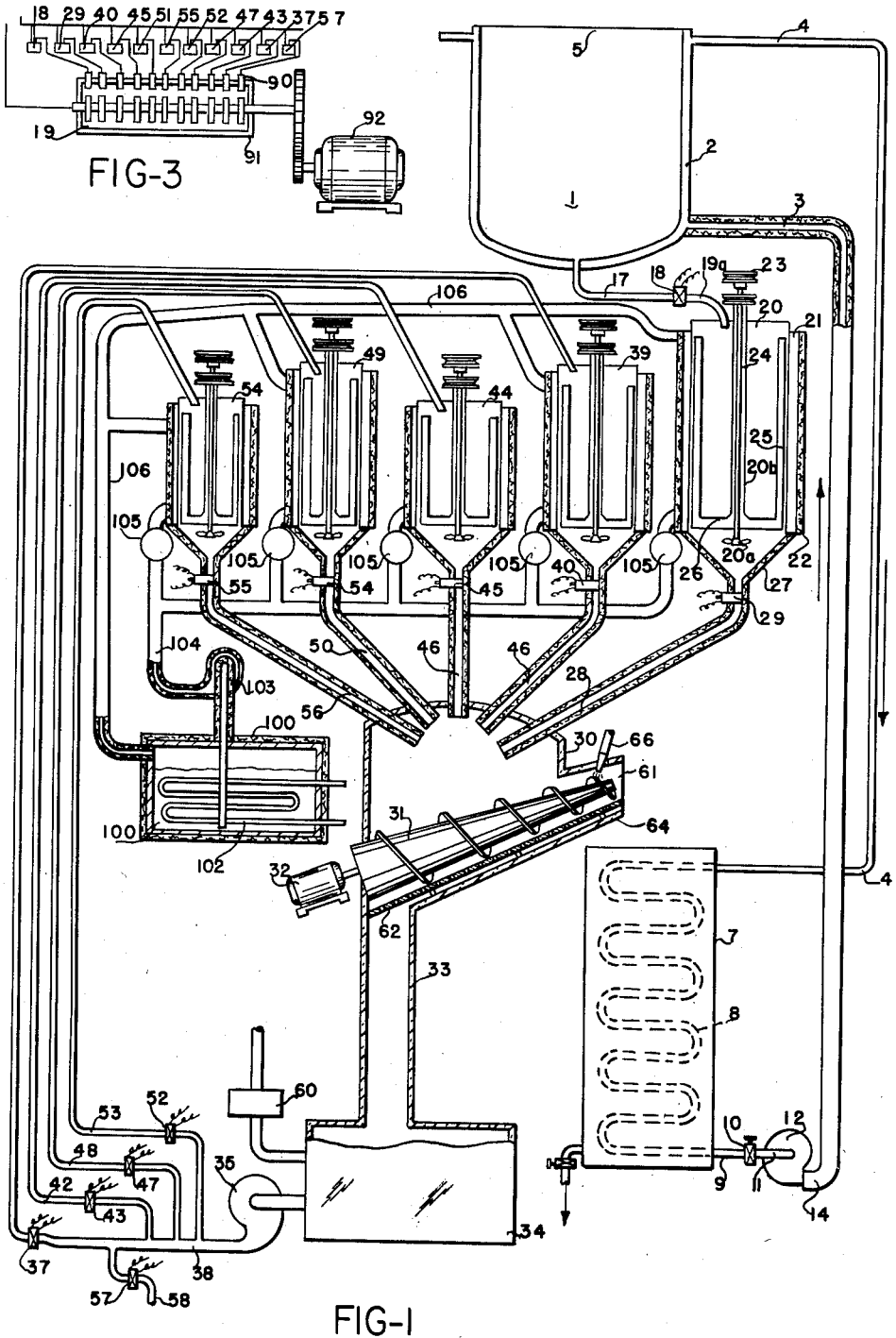
INVENTOR
ELWOOD P. WENZELBERGER
BY Toulmin & Toulmin
ATTORNEYS

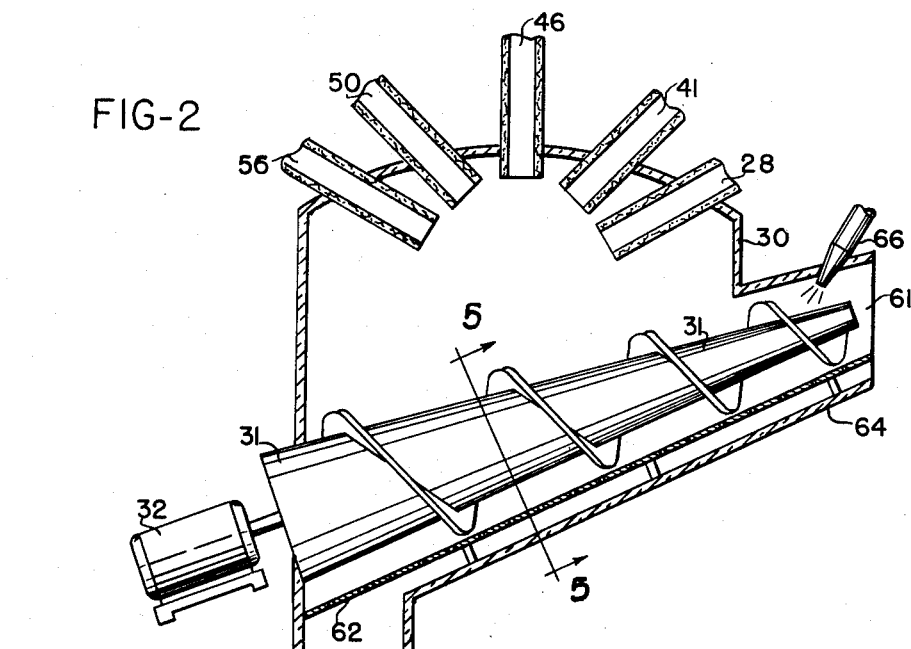
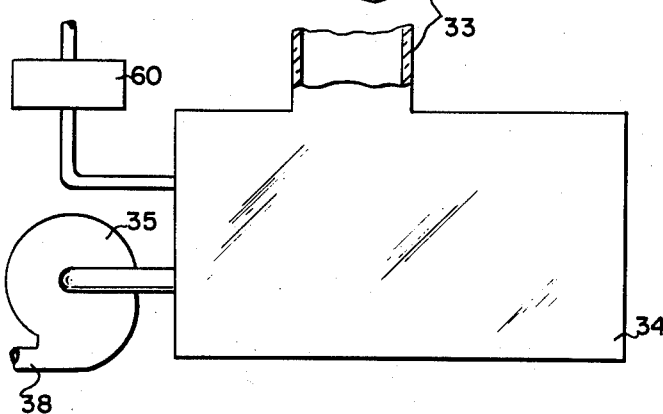
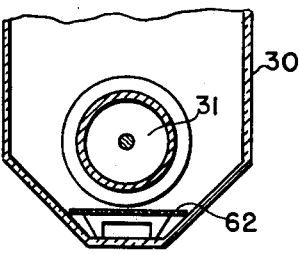
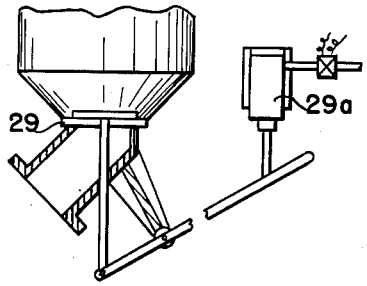

United States Patent Office 2,734,355
Patented Feb. 14, 1956

2,734,355
SUCTION APPARATUS FOR THE SEPARATION OF FLUID AND SOLIDS

Elwood P. Wenzelberger, Dayton, Ohio, assignor to The Commonwealth Engineering Company of Ohio, Dayton, Ohio, a corporation of Ohio Application March 13, 1952, Serial No. 276,347

9 Claims. (Cl. 62—124)

This invention relates to improvements in methods and apparatus for the dehydration of solutions and suspensions by solvent removal achieved through freezing of the solvent.

More particularly the invention relates to the method and apparatus for the separation of the frozen solvent from the desired fluid. For example, the invention relates particularly to the removal of water from fruit juices, beer, wines, pharmaceuticals such as antibiotics, heat sensitive resins, coffee, milk and vegetable juices.

This application is related to co-pending application Serial No. 276,346 filed March 13, 1952, and assigned to the same assignee as the present invention.

In issued United States Patent No. 2,559,205 I have described methods and apparatus for the concentration of materials of the kind set forth above wherein separation of the frozen solvent (water) from the juice is effected by a centrifugal operation. While this method is satisfactory, the centrifuge is a relatively expensive piece of high speed equipment which it is desirable to replace by machinery of lesser initial cost without sacrificing the effectiveness of the centrifuge.

It is accordingly a primary object of this invention to provide apparatus for fluid juice concentration equipment capable of effective and economical separation of frozen ice crystals from a fluid juice.

It is a further object of this invention to provide apparatus for fluid juice concentration equipment capable of satisfactory operation for separation of the frozen ice crystals at low feet per minute speeds.

It is a particular object of this invention to provide an economical and effective method of separating ice crystals from a fluid juice.

These and other objectives are attained by providing in a system similar to that described in the patent referred to hereinbefore a collecting chamber in which the ice and fluid mass is substantially continuously deposited onto an auger which operates at a slight angle to the horizontal. This auger is positioned over a stationary perforated screen to which suction is applied for drawing the liquid therethrough. The ice from which the juice has been removed passes upwardly on the auger through a tapered channel, which tapering serves to inhibit the formation of holes in the traveling material and thus is of material assistance in the maintenance of suction. The ice in its course passes through a light water spray to remove any juice clinging to the ice particles and the ice is then discharged from the chamber. The collected concentrated juice is received in a second chamber and is recycled therefrom as required for further concentration.

The invention will be more fully understood by reference to the following detailed description and the accompanying drawings wherein:

Figure 1 is a diagrammatic view of the complete mechanism for continuous and progressive dehydration;

Figure 2 is an enlarged sectional view of the separating means of invention;

Figure 3 is a view of the automatic electric control system for the apparatus;

Figure 4 is a detailed view of a valve used in connection with the freeze tanks of the apparatus; and Figure 5 is a fragmentary detail sectional view of the collecting chamber taken through the auger along the line 5—5 of Figure 2, and looking in the direction of the arrows.

Referring briefly to Figure 1, it will be noted that a supply tank 1 of raw juice cooled by a refrigerating liquid passed from line 3 through jacket 2 and out through line 4, is provided at the lower end thereof with an outlet 17 having an electrically operated valve 18. A tank 20 positioned below the outlet of line 17 is provided with a freezing chamber 21 insulated at 22 and connected with a conventional refrigerating system comprising a tank 100, a refrigerating liquid 101 therein, and a refrigerating coil 102 in the liquid 101. A pump 103 circulates the refrigerant through line 104 and thermostatic control valve 105 to chamber 21, the refrigerants being returned to tank 100 through line 106. The other tanks 39, 44, 49 and 54 are similarly refrigerated under control. Each of the tanks as at 20 is provided with a motor pulley 23, shaft 24 and vertical and horizontal stirrer blades 25, 26.

Also a propeller 20a is provided having an 18 degree pitch and driven by a shaft passing through the center of the hollow shaft of wiper 20b. The propeller 20a rotates clockwise at 600 to 800 R. P. M. and the wiper rotates counter-clockwise at about 125 R. P. M.

The tank 20 discharges through a valve 29 which together with valves 40, 50, 45, 51 and 55 are operably connected with a master sequence timer 19 which includes a plurality of cam acting switch means 90 each operated by one of a series of cams 91. The cams 91 are severally connected also with valves 18, 52, 47, 43, 37 and 57 and are actuated sequentially by operation of motor 92. The particular sequence of operation is fully set forth in my Patent No. 2,552,525 and accordingly need not be specifically set forth herein.

The valves 29, 40, 45, 51 and 55 are each closed when liquid is not passing therethrough and each is made substantially air tight to permit vacuum pressure to be applied to chamber 30 as described hereinafter.

Each of the tanks 20, 39, 44, 49 and 54 opens into a collecting chamber 30 of insulated material through an insulating line as at 28 and chamber 30 is provided with an auger 31 which is continuously driven by a motor 32. The auger 31 extends upwardly to an opening 61 in a tapered channel 64 and is positioned over a perforated screen 62.

The channel 64 is provided with a nozzle secured at 66 for the supplying of a light spray to the ice mass moving upwardly through the channel. Extending downwardly from the chamber 30 and open thereto is a throat 33 the lower end of which is connected into a tank 34. Tank 34 is provided in the upper portion thereof with an opening to which is secured a vacuum pump 60 while the lower end of the tank is provided with an opening to which is secured a recycling pump 35 opening into a recycling line as at 38.

In operation the collecting chamber 60 receives a quantity of juice and refrigerated ice from one of the tanks as at 20 and the tapered sides of this tank, as shown in Figure 5, urge the slush on to the auger 31. Suction is applied through throat 33 to the screen 62 and the slush mass on the auger 31. The juice is accordingly drawn from the mass down through the throat 33 into the tank 34.

Meanwhile the ice mass on the moving auger is moved upwardly towards opening 61 and receives a light spray of water from the nozzle 66 which is effective to remove any slight amount of juice from the ice and to pass it downwardly to the tank 34. The ice then passes from the chamber through opening 61 and may be utilized in other refrigeration operations of the apparatus. The juice collected in the tank 34 is recycled to the refrigeration tanks 39, 44, 49 and 54 as required for further concentration of the juice.

It may be noted that the ice mass will effectively block the entrance of air through opening 61 and accordingly the suction apparatus operates efficiently.

It will be understood that this invention is susceptible to modification in order to adopt it to different usages and conditions and accordingly, it is desired to comprehend such modifications within this invention as may fall within the scope of the appended claims.

I claim:

1. In apparatus for the concentration of a liquid bearing solids and solvent useful in combination with refrigerant means for forming within the said liquid a mass of small solvent crystals, the structure comprising a collecting chamber for said liquid and crystals, said chamber having lateral wall portions tapering and upwardly extending from the base thereof, said tapering lateral wall portion defining an opening in said chamber, an auger extending from said base upwardly through said lateral walls and terminating at its upper end in said tapering lateral wall portions, a screen member secured below said auger in closely spaced relation therewith, and means to apply suction pressure to said screen when said crystals and liquid cover said auger and screen to draw said liquid therethrough.

2. In apparatus for the concentration of a liquid bearing solids and solvent useful in combination with refrigerant means for forming within the said liquid a mass of small solvent crystals, the structure comprising a collecting chamber for said liquid and crystals, said chamber having lateral wall portions upwardly extending from the base thereof in tapering relation, said tapering lateral wall portion defining an opening in said chamber, an auger extending from said base upwardly through said tapering lateral walls and terminating at its upper end in said tapering lateral wall portions, a screen member secured below said auger in closely spaced relation therewith, and means to apply suction pressure to said screen when said crystals and liquid cover said auger and screen to draw said liquid therethrough.

3. In apparatus for the concentration of a liquid bearing solids and solvent useful in combination with refrigerant means for forming within the said liquid a mass of small solvent crystals, the structure comprising a collecting chamber for said liquid and crystals, said chamber having sloping lateral wall portions tapering laterally upwardly and extending from the base of said chamber, said tapering lateral wall portion defining an opening in said chamber, an auger extending from said base upwardly through said tapering lateral walls and terminating at its upper end in said tapering lateral wall portions, a screen member secured below said auger in closely spaced relation therewith, and means to apply suction pressure to said screen when said crystals and liquid cover said auger and screen to draw said liquid therethrough.

4. In apparatus for the concentration of a liquid bearing solids and solvent useful in combination with refrigerant means for forming within the said liquid a mass of small solvent crystals, the structure comprising a collecting chamber for said liquid and crystals, said chamber having lateral wall portions tapering and upwardly extending from the base thereof, said tapering lateral wall portion defining an opening in said chamber, an auger extending from said base upwardly through said lateral walls and terminating at its upper end in said tapering lateral wall portions, a screen member secured below said auger in closely spaced relation therewith, means to apply suction pressure to said screen when said crystals and liquid cover said auger and screen to draw said liquid therethrough, and means to collect the concentrated juice moving through said screen.

5. In apparatus for the concentration of a liquid bearing solids and solvent useful in combination with refrigerant means for forming within the said liquid a mass of small solvent crystals, the structure comprising a collecting chamber for said liquid and crystals, said chamber having lateral wall portions tapering and upwardly extending from the base thereof, an auger extending from said base upwardly through said lateral walls, a screen member secured below said auger in closely spaced relation therewith, means to apply suction pressure to said screen when said crystals and liquid cover said auger and screen to draw said liquid therethrough, and means secured in a said lateral wall to apply a fluid spray to said crystals to remove all liquid therefrom.

6. In apparatus for the concentration of a liquid bearing solids and solvent useful in combination with refrigerant means for forming within the said liquid a mass of small solvent crystals, the structure comprising a collecting chamber for said liquid and crystals, said chamber having lateral wall portions tapering and upwardly extending from the base thereof, said tapering lateral wall portion defining an opening in said chamber, an auger extending from said base upwardly through said lateral walls and terminating at its upper end in said tapering lateral wall portions, a screen member secured below said auger in closely spaced relation therewith, a conduit communicating with said screen, a tank at the lower end of said conduit, and means to apply suction to said tank, conduit and screen to draw said liquid through said screen to said tank.

7. In apparatus for the concentration of a liquid bearing solids and solvent useful in combination with refrigerating means for forming within the said liquid a mass of small solvent crystals, the structure comprising a collecting chamber for said liquid and crystals, said chamber having lateral wall portions tapering and upwardly extending from the base thereof, said tapering lateral wall portion defining an opening in said chamber, an auger extending from said base upwardly through said lateral walls and terminating at its upper end in said tapering lateral wall portions, a screen member secured below said auger in closely spaced relation therewith, means to apply suction pressure to said screen when said crystals and liquid cover said auger and screen to draw said liquid therethrough, and means to recycle said liquid to said refrigerating means for further concentration of said liquid.

8. In a process of dehydrating liquid bearing solids which consists in subjecting the same to refrigeration and separating the liquid from the liquid-solvent crystal slushy mass and which includes the steps of moving the mass upwardly and rotatably while pressuring the same and progressively decreasing the cross-sectional area thereof, and applying suction to the moving mass to cause the liquid to separate from the crystals thereof, and recycling the recovered liquid to the refrigeration treatment to recover a final concentrate substantially free of water.

9. In a process of dehydrating liquid bearing solids which consists in subjecting the same to refrigeration and separating the liquid from a liquid-solvent crystal slushy mass and which includes the steps of moving the mass upwardly and rotatably through a spacing of diminishing cross-section, applying suction to the moving mass to cause the liquid to separate from the crystals, and recycling the recovered liquid to the refrigeration treatment to recover a final concentrate substantially free of water.

References Cited in the file of this patent

UNITED STATES PATENTS

| Number | Name | Date |
| --- | --- | --- |
| 658,726 | Naef | Sept. 25, 1900 |
| 722,632 | Rothe | Mar. 10, 1903 |
| 1,445,917 | Souder | Feb. 20, 1923 |
| 1,906,534 | Burke | May 2, 1933 |
| 2,121,208 | Milligan | June 21, 1938 |
| 2,324,869 | Oman | July 20, 1943 |
| 2,386,052 | Lundy | Oct. 2, 1945 |